(12) United States Patent
Cowey

(10) Patent No.: US 9,090,414 B2
(45) Date of Patent: Jul. 28, 2015

(54) FENDER ASSEMBLY AND A METHOD FOR MANUFACTURING THE SAME

(76) Inventor: Steven John Cowey, Wingfield (AU)

( * ) Notice: Subject to any disclaimer, the term of this patent is extended or adjusted under 35 U.S.C. 154(b) by 586 days.

(21) Appl. No.: 13/124,506

(22) PCT Filed: Oct. 16, 2009

(86) PCT No.: PCT/AU2009/001362
§ 371 (c)(1),
(2), (4) Date: Jun. 13, 2011

(87) PCT Pub. No.: WO2010/042992
PCT Pub. Date: Apr. 22, 2010

(65) Prior Publication Data
US 2011/0254211 A1    Oct. 20, 2011

(30) Foreign Application Priority Data

Oct. 17, 2008    (AU) ................................. 2008905379

(51) Int. Cl.
*F16M 7/00*    (2006.01)
*B65G 69/00*    (2006.01)

(52) U.S. Cl.
CPC ..................................... *B65G 69/001* (2013.01)

(58) Field of Classification Search
USPC ........... 267/33, 116, 129, 140, 152, 153, 257, 267/292; 405/212, 215; 114/29, 30, 219
See application file for complete search history.

(56) References Cited

U.S. PATENT DOCUMENTS

| 2,879,985 | A | * | 3/1959 | Waddell et al. | 267/139 |
| 3,588,160 | A | * | 6/1971 | Reiner | 293/119 |
| 4,227,832 | A | * | 10/1980 | Leone et al. | 405/215 |
| 6,739,011 | B1 | * | 5/2004 | Brouillette | 14/71.1 |
| 2006/0049558 | A1 | * | 3/2006 | Cowey | 267/140 |

FOREIGN PATENT DOCUMENTS

| AU | 2003265715 B2 | 7/2004 |
| AU | 2006246507 A1 | 12/2006 |
| AU | 2008100820 A4 | 9/2008 |
| AU | 2010200807 A1 | 3/2010 |
| EP | 2 128 054 A1 | 12/2009 |

(Continued)

OTHER PUBLICATIONS

International Search Report for Application No. PCT/AU2009/001362 dated Dec. 23, 2009.

(Continued)

*Primary Examiner* — Christopher Schwartz
(74) *Attorney, Agent, or Firm* — Alston & Bird LLP

(57) ABSTRACT

A fender assembly is disclosed. The fender assembly comprises an elongate support adapted to be attached to a surface of a support structure, the elongate support defining surfaces both inwardly and outwardly directed relative to the support surface, a resilient elongate fender mounted on the outer surface of the support and guided there along for vertical sliding movement relative thereto, and the inner surfaces defining a housing for a spring loaded fender restraining means co-acting with and adapted to resist downwardly directed sliding movement of the resilient elongate fender relative to the elongate support. An associated method for fabricating a fender assembly is also disclosed.

20 Claims, 8 Drawing Sheets

(56) References Cited

FOREIGN PATENT DOCUMENTS

| | | |
|---|---|---|
| FR | 2 686 913 A1 | 8/1993 |
| WO | WO 2006/037177 A1 | 4/2006 |

OTHER PUBLICATIONS

Written Opinion for Application No. PCT/AU2009/001362 dated Dec. 23, 2009.

* cited by examiner

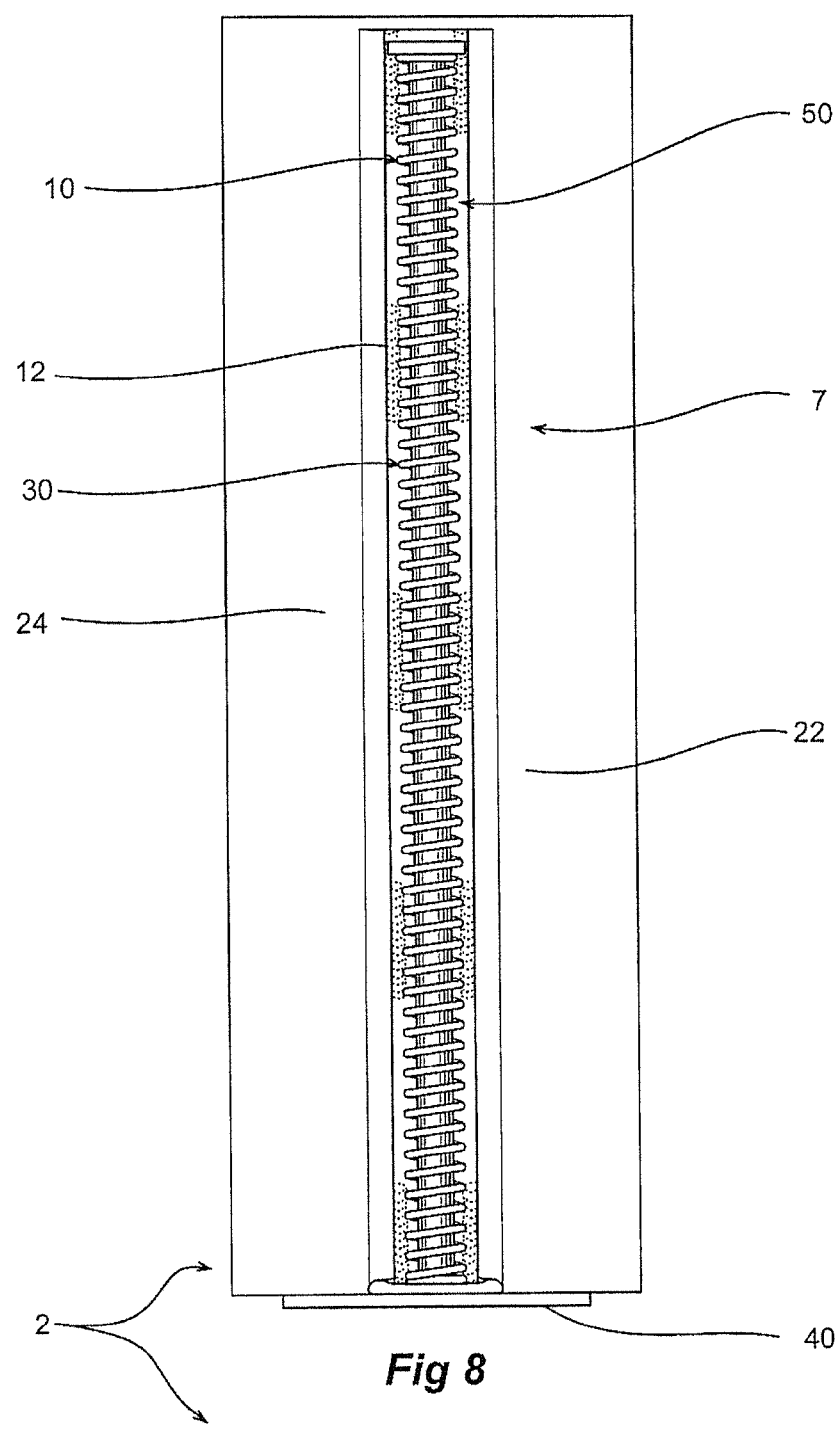
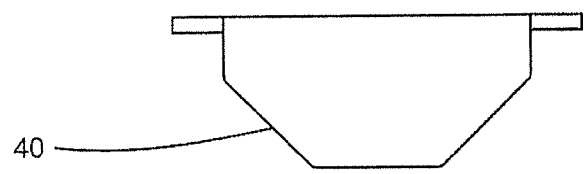
Fig 8
Fig 9

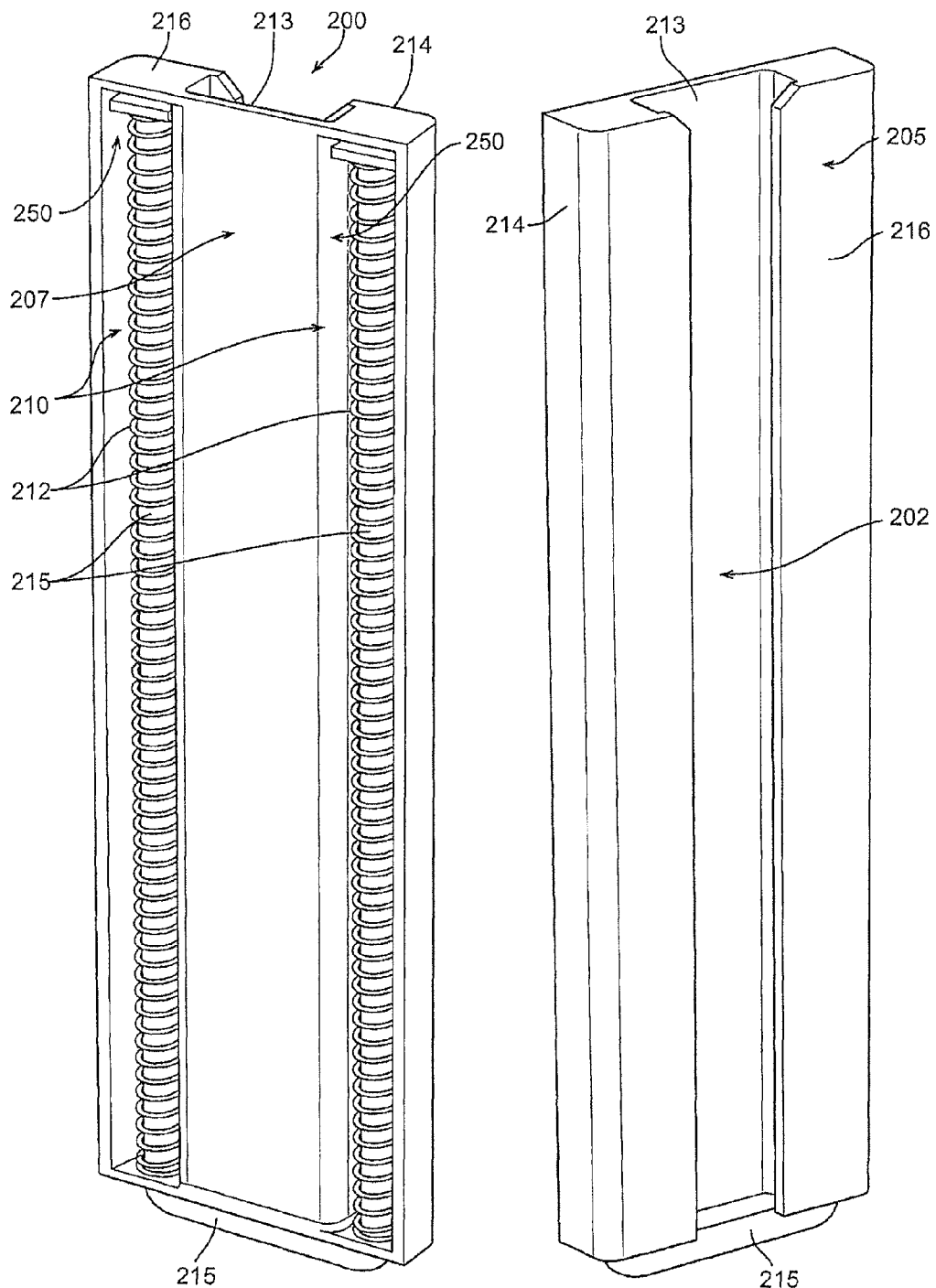
*Fig 10*  *Fig 11*

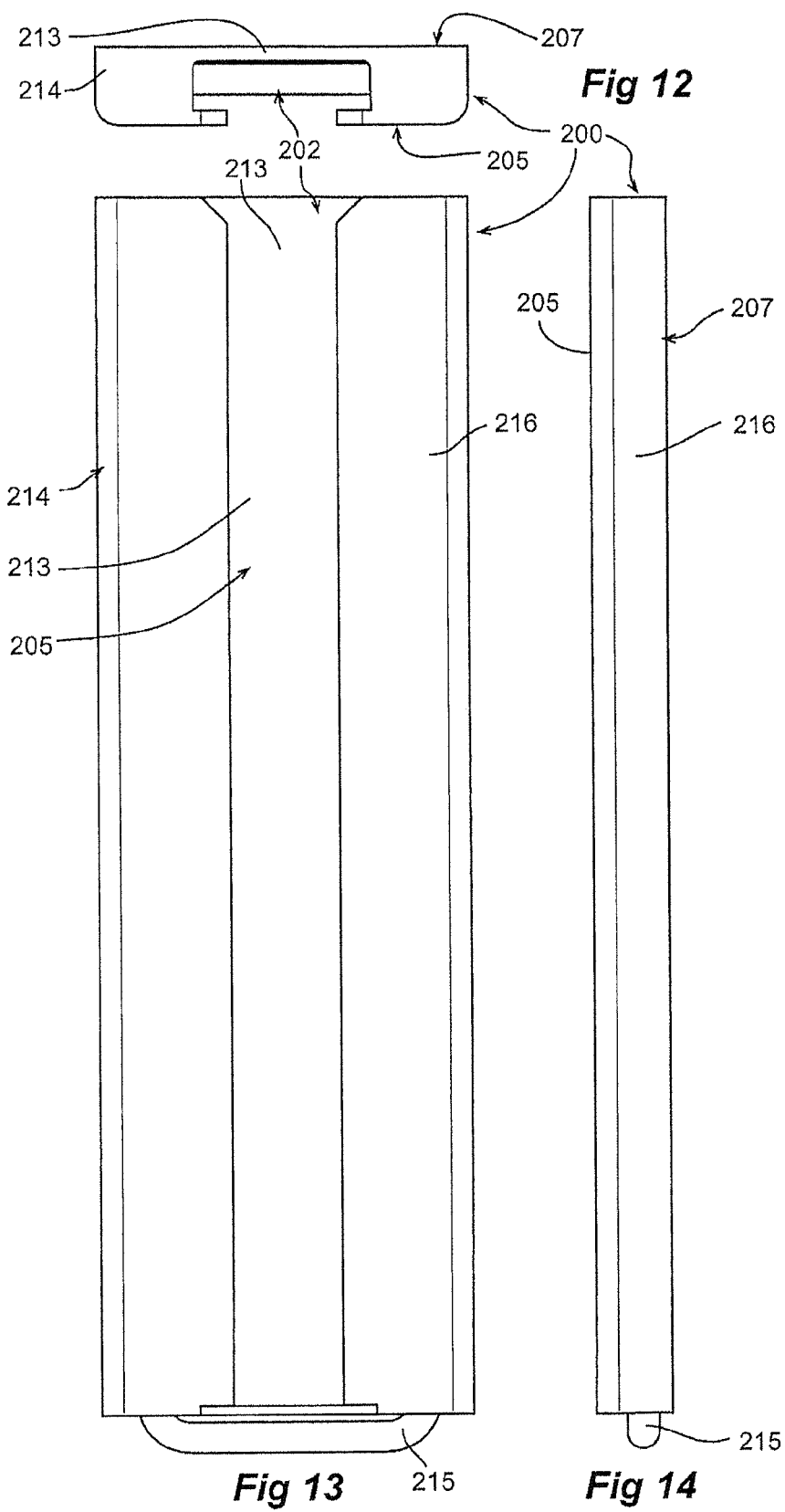

FENDER ASSEMBLY AND A METHOD FOR MANUFACTURING THE SAME

FIELD OF THE INVENTION

This invention relates generally to a fender assembly and a method for manufacturing the same.

In particular, this invention relates to a fender assembly which may be used for protecting vehicle loading docks against damage during the loading or unloading of trailers. The fender assembly according to the present invention is not so limited in its application however, in so much as it may be used in maritime applications, where vessels dock against a wharf or pontoon, and where relative movement occurs between these.

INCORPORATION BY REFERENCE

This patent application claims priority from:
AU 2008905379 titled "A fender assembly and a method of manufacture of the same" filed on 17 Oct. 2008.
The entire content of this application is hereby incorporated by reference.

BACKGROUND OF THE INVENTION

The inventor of the fender assembly disclosed herein previously conceived of the fender assemblies disclosed in Australian Patent Applications 2003265715 and 2006246507, discussion of which should be considered included herein by way of reference.

A problem with the aforementioned fender assemblies however is that much of the workings of these was exposed, and so unprotected from not just collisions, but dirt and debris, which can cause these workings to foul.

An object of the present disclosure therefore is to substantially ameliorate this difficulty, or to at least provide a fender assembly which is a useful alternative to the fender assemblies according to the abovementioned preceding disclosures.

Other objects and advantages of the present invention will become apparent from the following description, taking in connection with the accompanying drawings, wherein, by way of illustration and example, an embodiment of the present invention is disclosed.

For the purpose of this specification, the word "comprising" means "including but not limited to", and the word 'comprises' has a corresponding meaning.

SUMMARY OF THE INVENTION

In one aspect of this invention, there is proposed a fender assembly comprising an elongate support adapted to be attached to a surface of a support structure, the elongate support defining surfaces both inwardly and outwardly directed relative to the support surface, a resilient elongate fender mounted on the outwardly directed surface of the support and guided there along for vertical sliding movement relative thereto, and the inwardly directed surfaces defining a housing for a biased fender restraining means co-acting with and adapted to resist downwardly directed sliding movement of the resilient elongate fender relative to the elongate support.

In one form, the resilient elongate fender is a solid rubber or rubber-like block.

In one form, the elongate support is adapted to be attached to a surface of a support structure by way of its comprising an elongate planar or channel section plate which is fixable to the dock support surface by means of welding.

In one form, the biased fender restraining means comprises a spring guide element upon which a spring is disposed and a transverse abutment extending from the spring guide element against which an underside of the resilient elongate fender engages when this is in a normal at rest position, and whereby any downwards movement of the resilient elongate fender causes simultaneous downward movement of the abutment and spring guide element, and thereby compression of the spring.

In one form, the resilient elongate fender will slide upwards relative to the support under the influence of an external upwards force applied thereto and then return to its at rest position under its own weight when the force is removed.

In one form, the spring guide element is a rigid element.
In one form, the spring guide element is a rod.
In one form, the spring guide element is a flexible element.
In one form, the spring guide element is a length of cable.
The spring guide element may be a flexible one, as its key load state is in tension, when the resilient fender is displaced downwardly against the bias of the spring. An advantage of a flexible element is that it cannot be plastically bent in the same way that a rigid elongate rod can. This is especially relevant when one considers that a bent rigid element of this type (i.e. a rigid rod bent by an impact there against) can render the fender assembly unserviceable.

In one form, the outwardly directed surface of the elongate support defines an outwardly projecting vertical guide track.

In one form, the outwardly projecting vertical guide track has inwardly directed surfaces defining a housing for the biased fender restraining means.

In one form, the resilient elongate fender comprises a slotted keyway extending centrally along its rear face, said guide track slidably engaging within said keyway.

In one form, the keyway extends between top and bottom faces of the resilient elongate fender and said guide track has a length which approximates the length of keyway, and wherein the abutment is located adjacent the lower end of the track.

In one form, the outwardly directed surface of the elongate support defines a recessed vertical guide track, and the resilient elongate fender comprises a projection of matching shape extending from a back side thereof, so that this projection may slide down into the guide track and be slidably retained by this.

In one form, to either side of the recessed vertical guide track inwardly directed surfaces of the elongate support define a pair of spaced apart housings, each of which houses a biased fender restraining means.

In one form, each biased fender restraining means comprises a spring guide element upon which a spring is disposed, and a common transverse abutment extending between the two spring guide elements, against which an underside of the resilient elongate fender engages.

In one form, the projection extends between top and bottom faces of the resilient elongate fender and said recessed guide track has a length which approximates the length of the projection, and wherein the abutment is located adjacent the lower end of the track.

In one form, the elongate support is fabricated from elongate lengths of commercially available steel section.

In one form, these commercially available steel sections include an elongate length of flat plate having first and second opposing major faces, two identical lengths of elongate angled section, each of these being welded along an edge thereof to the same major face of the flat plate so as to be extending in the same direction longitudinally, but also so as to be spaced apart, substantially parallel, and oppositely directed, so as to define between them, a passageway.

In one form, these commercially available steel sections from which the fender assembly is fabricated comprises a length of steel channel, and a pair of lengths of elongate angled section, where each of a pair of parallel, spaced apart elongate edges of the channel has an inner surface of one of the angled sections welded thereto, such that these angled sections are parallel and spaced apart.

In a further aspect, the invention may be said to reside in a method of fabricating an elongate support for a fender assembly as described above, the method including the step of cutting elongate lengths of commercially available steel section to the same length, and then welding these together.

In a further aspect, the invention may be said to reside in a loading dock assembly incorporating a pair of fender assemblies as claimed any one of the preceding claims to a fender assembly.

In this respect, before explaining at least one embodiment of the invention in detail, it is to be understood that the invention is not limited in its application to the details of construction and to the arrangements of the components set forth in the following description or illustrated in the drawing. The invention is capable of embodiments in addition to those described and of being practiced and carried out in various ways. Also, it is to be understood that the phraseology and terminology employed herein, as well as the abstract, are for the purpose of description and should not be regarded as limiting.

The accompanying drawings, which are incorporated in and constitute a part of this specification, illustrate certain embodiments of the invention, and together with the description, serve to explain the principles of the invention.

Those skilled in the art will appreciate that the conception upon which this disclosure is based may readily be utilized as a basis for designing other structures, methods, and systems for carrying out the several purposes of the present invention. It is important, therefore, to recognise that the claims should be regarded as including such equivalent constructions insofar as they do not depart from the spirit and scope of the present invention.

BRIEF DESCRIPTION OF THE FIGURES

For a better understanding of this disclosure it will now be described with respect to one or more exemplary embodiments which shall be described herein with the assistance of drawings wherein:

FIG. 8 is a rear view of the elongate support in FIG. 3;

FIG. 9 is an underside of the elongate support in FIG. 3;

FIG. 10 is a rear perspective view of the elongate support from the fender assembly in FIG. 2;

FIG. 11 is a front perspective view of the elongate support in FIG. 10;

FIG. 12 is a top view of the elongate support in FIG. 10;

FIG. 13 is a front view of the elongate support in FIG. 10;

FIG. 14 is a side view of the elongate support in FIG. 10;

In the following description, like reference characters designate like or corresponding parts throughout the several views of the drawings.

DETAILED DESCRIPTION OF THE INVENTION

Figure 1:
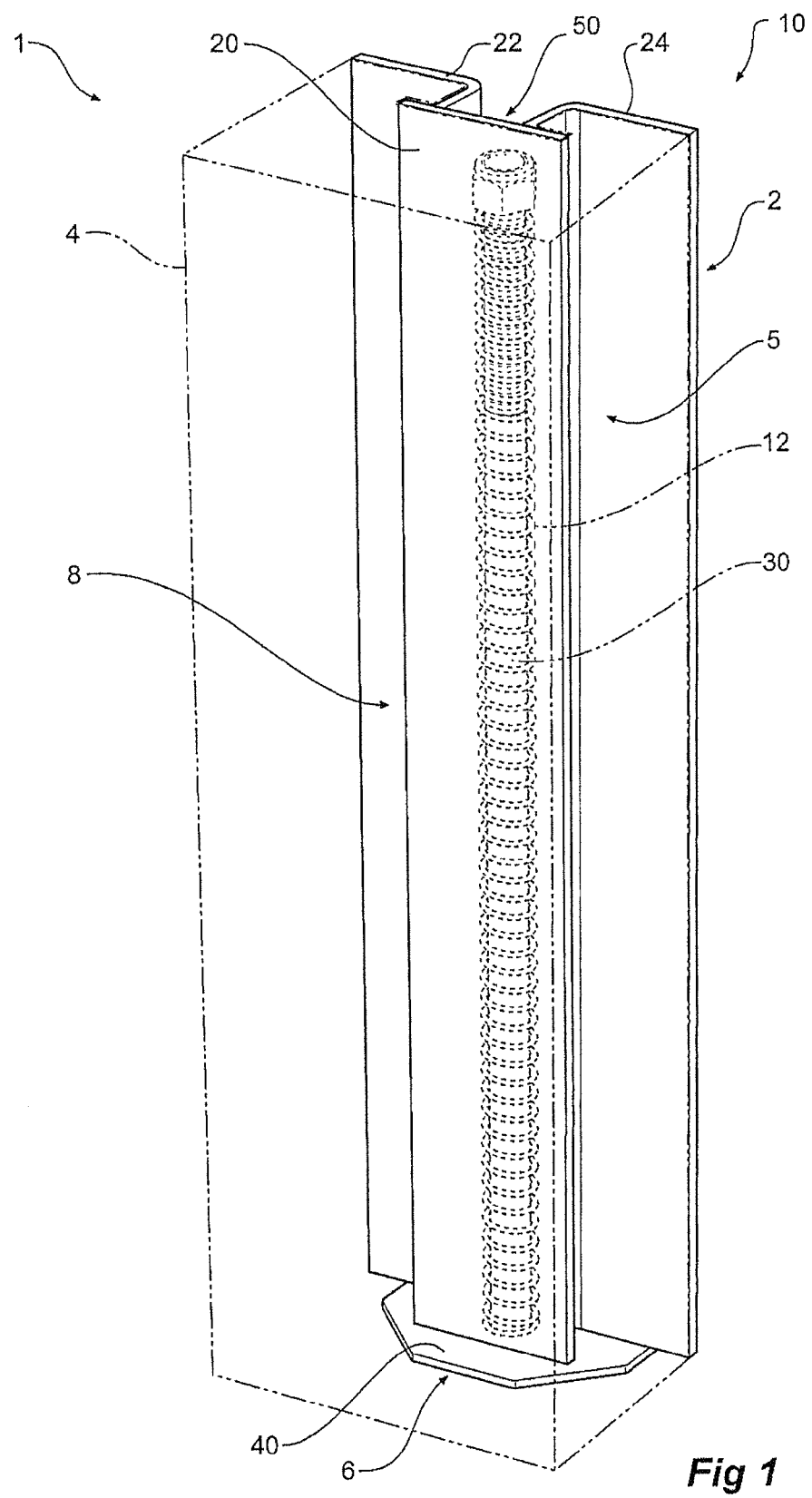
FIG. 1 is a front perspective view of a fender assembly according to a first exemplary embodiment.

Referring now to FIG. 1, where an exemplary embodiment of a fender assembly 1 is illustrated.

The fender assembly 1 comprises an elongate steel support 2, which, in use, may be welded to a vertical support surface of a dock; a resilient elongate fender 4 in the form of solid rubber block (represented with dashed lines in FIG. 1) mounted on the support 2 and guided there along for sliding movement relative thereto, and a biased (spring loaded) fender restraining mechanism 6 which supports the resilient elongate fender 4 so as to resist downwardly directed sliding movement of the fender 4 relative to the elongate support 2.

The elongate support 2 is manufactured so as to have surfaces 5 outwardly directed from the support surface of the dock, which define a generally 'T-shaped' guide track 8 for the resilient fender 4. The resilient fender 4 will have a groove of matching shape formed or moulded into a back side thereof, so that the resilient fender 4 may slide down onto the guide track 8 and be slidably retained by this.

The outwardly projecting vertical guide track 8 has inwardly directed surfaces 7. These inwardly directed surfaces 7 including an inwardly directed concave surface 50 representing a concave section of the inwardly directed surface. The inwardly directed concave surface 50 facing the support structure and defining a housing 10 (in the form of passageway 10) for the biased fender restraining means, so that at least the spring 12 and the rod 30 upon which the spring 12 is disposed may be housed. An advantage of housing the spring 12 and rod 30 in this fashion is that they are guarded and therefore less susceptible to damage, dirt and weathering; a further advantage is that the pinching hazard posed by the spring 12 is significantly reduced as compared with an exposed spring.

The elongate support 2 is fabricated from commercially available steel sections. These commercially available steel sections include an elongate length of flat plate 20 having first and second opposing major faces, and two identical lengths of elongate angled section 22 and 24. Each of the lengths of angled section is welded along an edge thereof to the same major face of the flat plate so as to be extending in the same direction longitudinally, but also so as to be spaced apart, substantially parallel, and oppositely directed. Between them, these assembled steel sections define the passageway 10 in which at least the spring 12 and the rod 30 are housed.

The upper corners of plate 20 are cut so as to be bevelled; these bevelled corners 20a and 20b are less susceptible to bending (than an unbevelled corner) when the elongate support 2 is in service as part of a fender assembly 1. Moreover, these bevelled corners 20a and 20b reduce the effort required to slide a resilient elongate fender 4 on to the 'T-shaped' guide track 8, of which this plate 20 forms a part. This is particularly useful when a worn or damaged resilient elongate fender 4 must be replaced The spring 12 is a relatively heavy duty helical compression spring, which is disposed upon a rod 30; this spring 12 is retained between a spring retention tab 32 that is welded to the upper end of the rod 30, and a spring supporting plate 34 which extends across the lower end of the passageway 10.

Figures 3, 4:
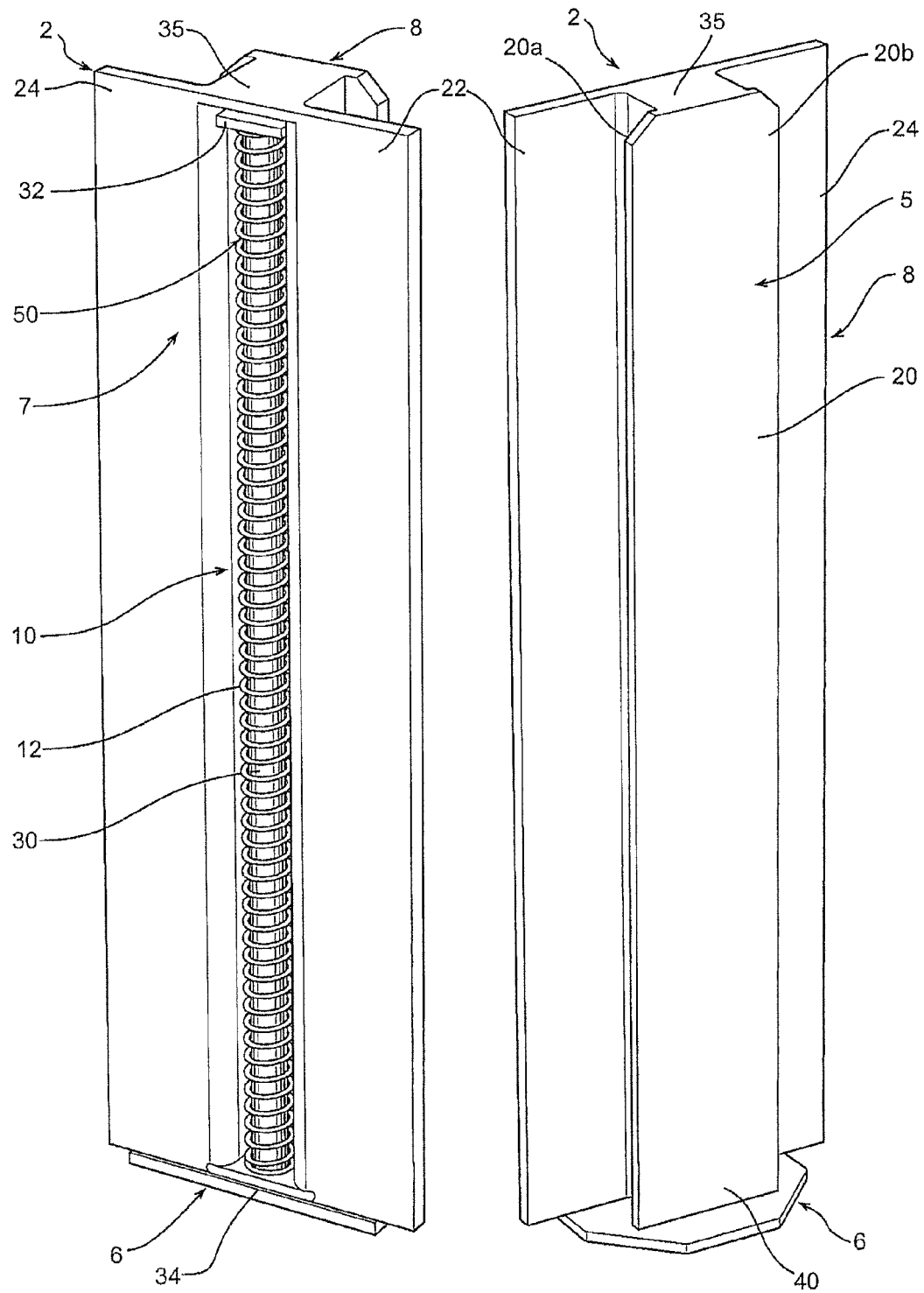
FIG. 3 is a rear perspective view of the elongate support from the fender assembly in FIG. 1.
FIG. 4 is a front perspective view of the elongate support in FIG. 3.
Figures 5, 6, 7:
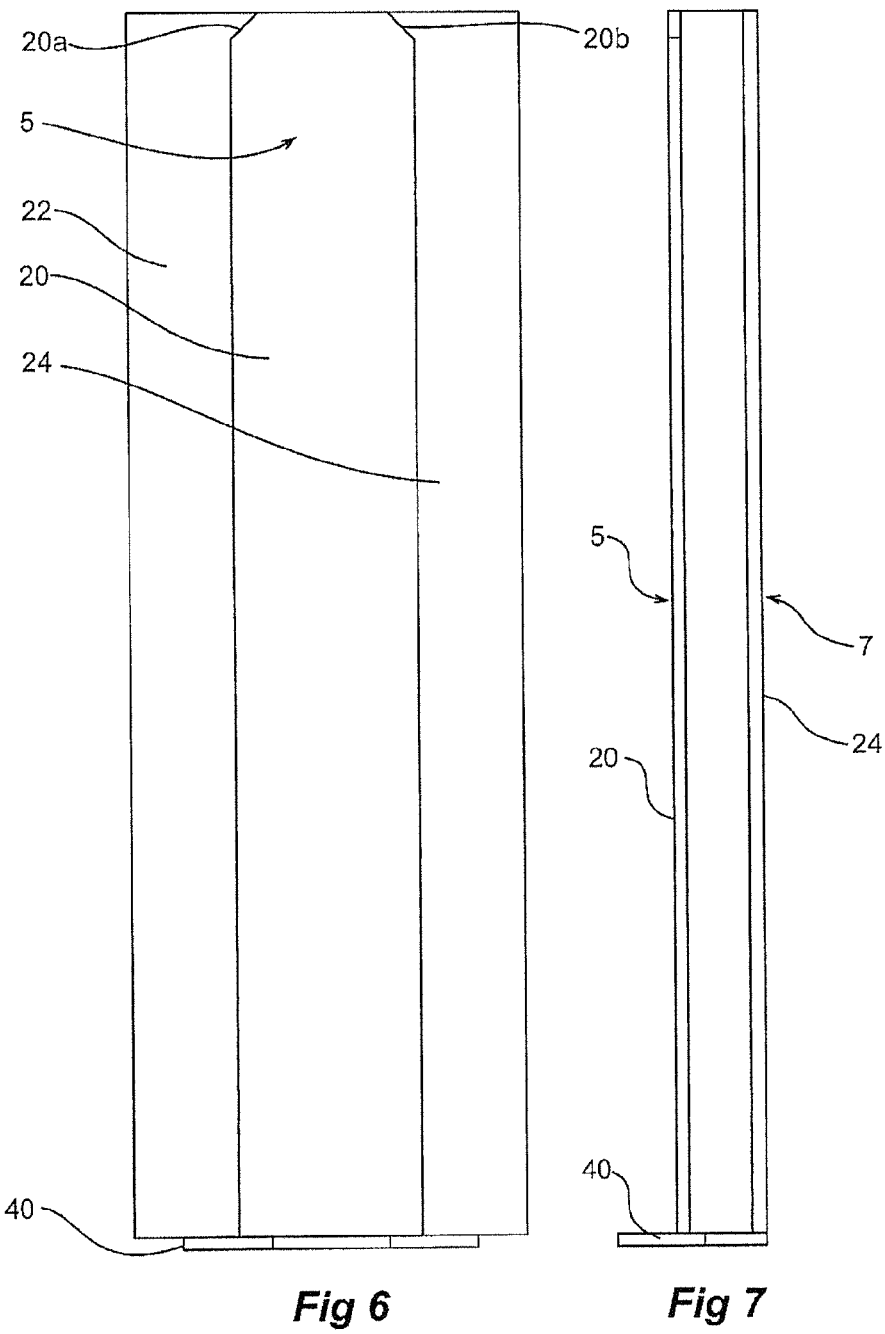
FIG. 5 is a top view of the elongate support in FIG. 3.
FIG. 6 is a front view of the elongate support in FIG. 3.
FIG. 7 is a side view of the elongate support in FIG. 3.
Figure 15:
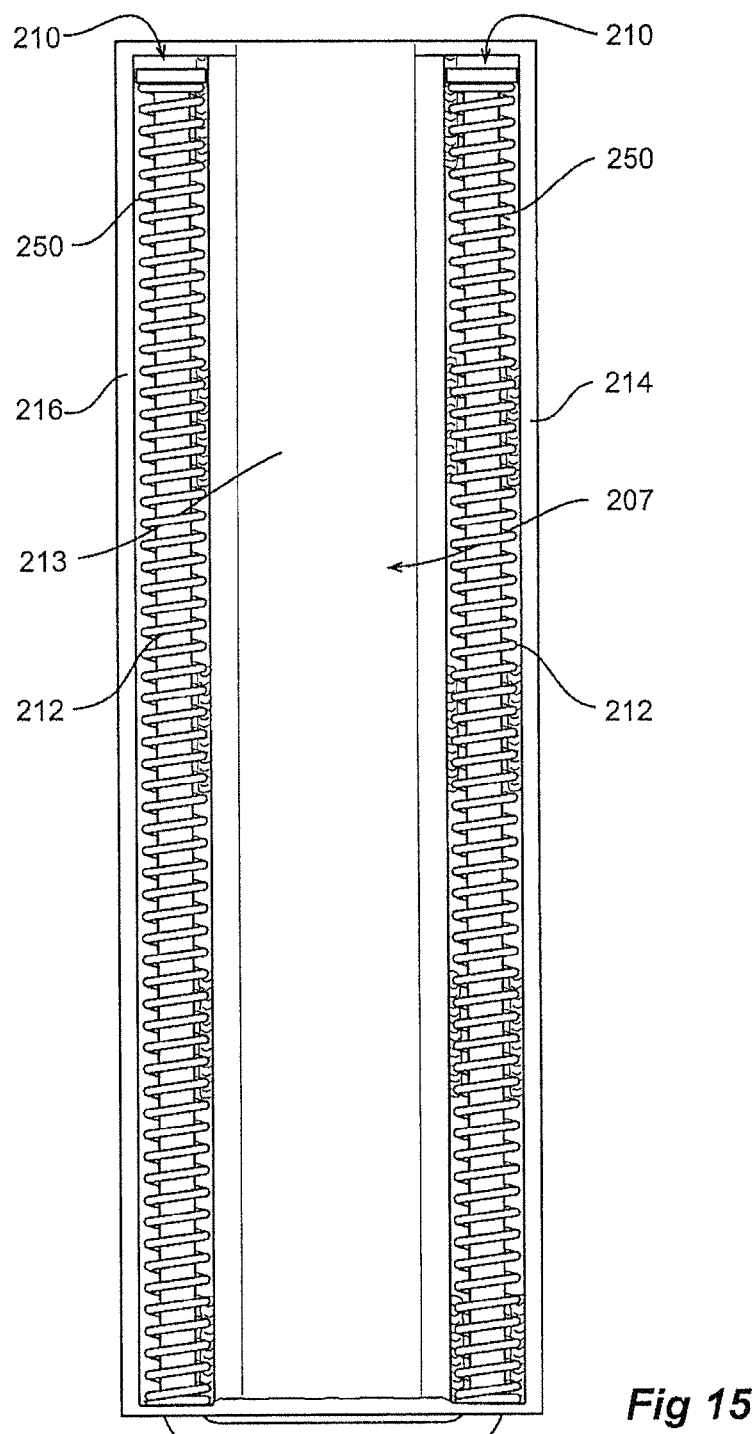
FIG. 15 is a rear view of the elongate support in FIG. 10.
Figure 16:
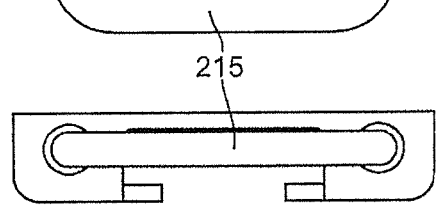
FIG. 16 is an underside view of the elongate support in FIG. 10.

The upper end of the passageway 10 is similarly closed off by the welding of a blank of steel plate 35 in the space defined between the length of flat plate 20 and the lengths of elongate angled section 22 and 24. For illustrative purposes, this blank 35 has been outlined with dashed lines in FIGS. 3, 4 and 5. Closing off the upper end of the passageway 10 in this fashion prevents miscellaneous debris from entering the passageway 10 via this upper end, and potentially fouling operation of the spring 12 and rod 30.

This spring supporting plate 34 has a hole 36 therethrough, through which the rod 30, but not the spring 12, may pass with a sliding action. In embodiments that include a blank 35 and/or late 40 these features ma be a art of the inwardly directed concave surface 50 that defines the housing 10.

Attached to the lower end of the rod is a plate 40 forming a transverse abutment which extends outwardly so that the lowermost edge of the resilient elongate fender 4 may abut against this.

In use, when a trailer is backed up against the dock with its rear end making pressure contact with the resilient elongate fenders 4 of fender assemblies 1, any movement of the trailer up or down will cause the resilient elongate fenders 4 of fender assemblies 1 to move in the same way. While the resilient elongate fenders 4 may slide upward from the rest position without meeting resistance from the springs 12, any downward movement will meet resistance from the springs 12.

Figure 2:
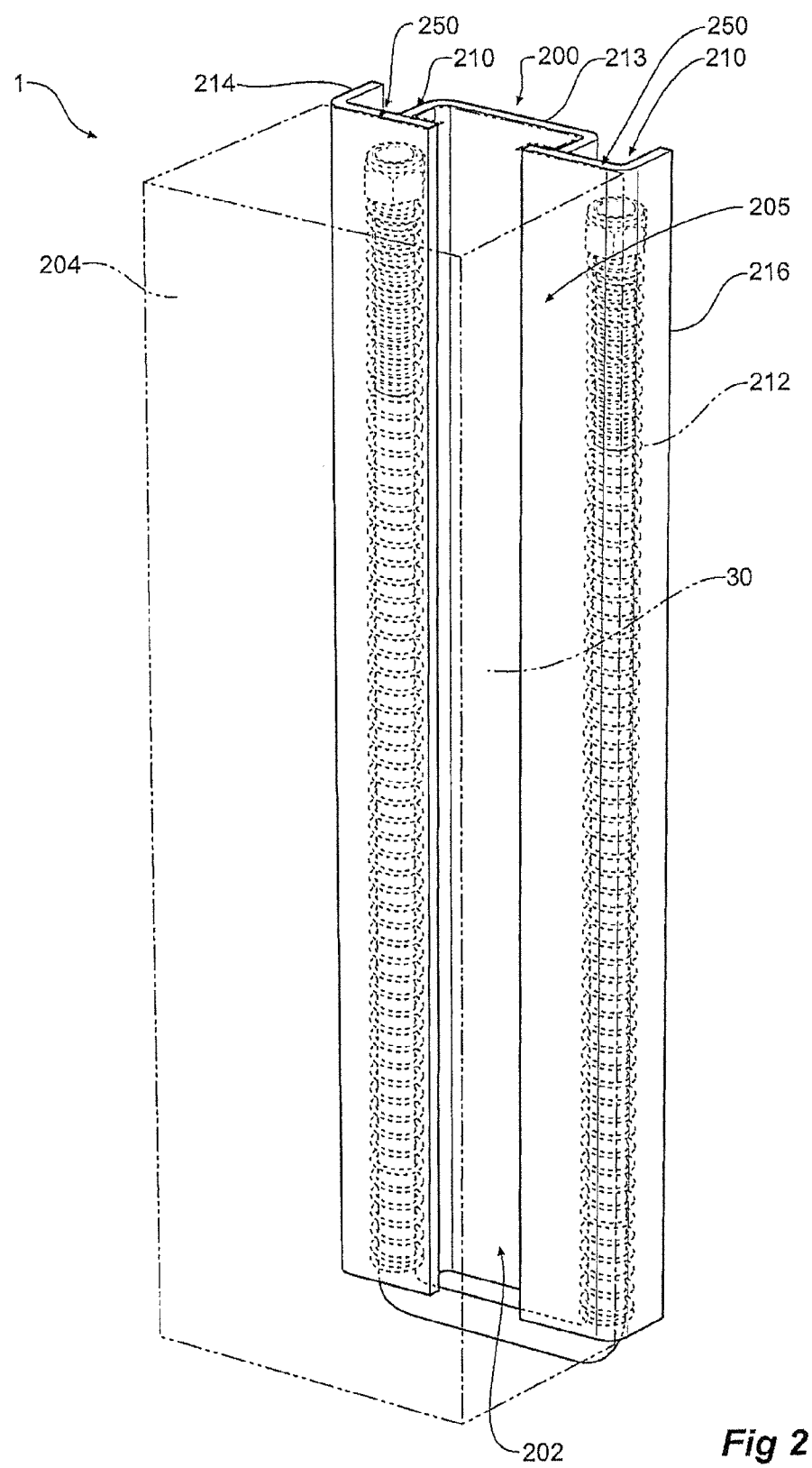
FIG. 2 is a front perspective view of a fender assembly according to a second exemplary embodiment.

With reference now to FIGS. 2, 10 through 16, where an alternative exemplary embodiment is illustrated, wherein this elongate support 200 is manufactured so as to have surfaces 205 outwardly directed from the dock which are defining a generally 'C-shaped' recessed or concave guide track 202 for the resilient fender 204 (represented with dashed lines in FIG. 2). The resilient fender 204 for this support 200 will have a projection of matching shape extending from a back side thereof, so that the resilient fender 204 may slide down into the guide track 202 and be slidably retained by this.

The inwardly directed surfaces 207 of the elongate support 200 are directed inwardly toward the dock. These inwardly directed surfaces 207 including an inwardly directed concave surface 250 representing a concave section of the inwardly directed surface. The inwardly directed concave surface 250 facing the support structure and defining a pair of spaced apart passageways 210 (housings) in which one each of the two springs 212 of the spring loaded fender restraining means may be housed. These two springs 212 are disposed upon a u-shaped rod 215 in a fashion similar to that disclosed above. A transverse portion of the rod 215 extends between parallel portions so as to form thereby a transverse abutment; the lowermost edge of the resilient elongate fender 4 abuts against this transverse portion of the rod 215.

The elongate support 200 is fabricated from commercially available steel sections. These commercially available steel sections include a length of steel channel 213, and a pair of lengths of elongate angled section 214 and 216. The elongate edges of the channel 213 each have an inner surface of one of the angled sections 214 and 216 welded thereto. These angled sections 214 and 216 are spaced apart, parallel and they slightly overlap the elongate edges of the channel 213. Otherwise, elongate support 200 operates in the same way and includes the same features as elongate support 2 described above.

Consideration of the above described disclosure will indicate that this teaches a support for a fender unit in particular whose workings are guarded, and whose manufacture may be less time and labour intensive than that of the supports for the fender units previously conceived by the inventor.

In this specification unless the contrary is expressly stated, where a document, act or item of knowledge is referred to or discussed, this reference or discussion is not to be construed as an admission that the document, act or item of knowledge or any combination thereof was at the priority date, publicly available, known to the public, part of common general knowledge; or known to be relevant to an attempt to solve any problem with which this specification is concerned.

Although the disclosure has been herein shown and described in what is conceived to be the most practical and preferred embodiment, it is recognized that departures can be made within the scope of the invention, which is not to be limited to the details described herein but is to be accorded the full scope of the appended claims so as to embrace any and all equivalent devices and apparatus.

The invention claimed is:

1. A fender assembly comprising:
   a fender support adapted to be attached to a support surface of a support structure, the fender support defining:
      at least one inwardly directed concave surface configured to face toward the support surface and defining a housing, such that the housing is adapted to be defined between the at least one inwardly directed concave surface and the support structure, and
      an outwardly directed side configured to face away from the support surface, the outwardly directed side of the fender support comprising a substantially vertically extending guide track;
   a resilient fender slidably retained by the fender support and guided on the guide track for vertical sliding movement relative to the fender support; and
   at least one biased fender restraining means at least partially disposed in the housing, the at least one biased fender restraining means adapted to resist a downwardly directed sliding movement of the resilient fender relative to the fender support,
   wherein the resilient fender overlaps the fender support, such that at least a portion of the resilient fender is configured to be disposed perpendicularly closer to the support surface than at least a portion of the housing.

2. The fender assembly of claim 1, wherein the resilient fender is a solid rubber or rubber-like block.

3. The fender assembly of claim 1, wherein the biased fender restraining means comprises a spring guide element upon which a spring is disposed and a transverse abutment extending from the spring guide element, such that the transverse abutment is configured to engage an underside of the resilient fender in a normal at rest position, and whereby any downwards movement of the resilient fender is configured to cause simultaneous downward movement of the abutment, spring guide element and thereby compression of the spring.

4. The fender assembly as in claim 3, wherein the resilient fender is configured to slide upwards relative to the fender support under the influence of an external upwards force applied thereto and then return to its at rest position under its own weight when the force is removed.

5. The fender assembly of claim 3, wherein the spring guide element is a rigid element.

6. The fender assembly of claim 5, wherein the spring guide element is a rod.

7. The fender assembly of claim 3, wherein the spring guide element is a flexible element.

8. The fender assembly of claim 7, wherein the spring guide element is a length of cable.

9. The fender assembly of claim 1, wherein the guide track is outwardly projecting.

10. The fender assembly of claim 9, wherein the at least one inwardly directed concave surface is defined inside the outwardly projecting vertical guide track such that the vertical guide track shares at least one wall with the housing.

11. The fender assembly of claim 9, wherein the resilient fender comprises a slotted keyway extending centrally along a rear face thereof, said vertical guide track being configured to slidably engage within said keyway.

12. The fender assembly of claim 11, wherein the keyway extends between top and bottom faces of the resilient fender, and said guide track has a length which approximates the length of keyway, and wherein an abutment is located adjacent the lower end of the track.

13. The fender assembly of claim 1, wherein the guide track is recessed into the outwardly directed side, and the resilient fender comprises a projection of matching shape extending from a back side thereof, so that this projection is configured to slide down into the guide track and be slidably retained by the guide track.

14. The fender assembly of claim 13, wherein the housing and a second housing are disposed to either side of the recessed vertical guide track, such that the housing and the second housing define each share at least one wall with the guide track.

15. The fender assembly of claim 14, wherein each biased fender restraining means comprises a spring guide element upon which a spring is disposed, and a common transverse abutment extending between the two spring guide elements, against which an underside of the resilient fender is configured to engage.

16. The fender assembly of claim 13, wherein the projection extends between top and bottom faces of the resilient fender and said recessed guide track has a length which approximates the length of the projection, and wherein the abutment is located adjacent the lower end of the track.

17. The fender assembly of claim 1, wherein the fender support is fabricated from elongate lengths of commercially available steel section.

18. The fender of claim 17, wherein these commercially available steel sections include an elongate length of flat plate having first and second opposing major faces, two identical lengths of elongate angled section, each of these being welded along an edge thereof to the same major face of the flat plate so as to be extending in the same direction longitudinally, but also so as to be spaced apart, substantially parallel, and oppositely directed, so as to define between them, the housing.

19. The fender of claim 17, wherein these commercially available steel sections from which the fender assembly is fabricated comprises a length of steel channel, and a pair of lengths of elongate angled section, where each of a pair of parallel, spaced apart elongate edges of the channel has an inner surface of one of the angled sections welded thereto, such that these angled sections are parallel and spaced apart.

20. A fender assembly comprising:
a fender support adapted to be attached to a support surface of a support structure, the fender support defining:
at least one inwardly directed concave surface configured to face toward the support surface and defining a housing, such that the housing is adapted to be defined between the at least one inwardly directed concave surface and the support structure, and
an outwardly directed side configured to face away from the support surface, the outwardly directed side of the fender support comprising a substantially vertically extending guide track;
a resilient fender slidably retained by the fender support and guided on the guide track, such that the resilient fender is configured for vertical sliding movement relative to the fender support, and
at least one biased fender restraining means adapted to resist downwardly directed sliding movement of the resilient fender relative to the fender support,
wherein the biased fender restraining means comprises a spring and a spring guide element, and
wherein the housing is configured to surround the spring on at least three sides, the at least three sides including an opposite side configured to be disposed opposite the support surface of the support structure.

\* \* \* \* \*